United States Patent [19]

Phillips

[11] 4,061,720

[45] Dec. 6, 1977

[54] PREPARATION OF AMMONIUM AND POTASSIUM ZIRCONIUM CARBONATES

[75] Inventor: Raymond Francis Phillips, Cheadle Holme, England

[73] Assignee: Magnesium Elektron Limited, Switon, England

[21] Appl. No.: 623,992

[22] Filed: Oct. 20, 1975

Related U.S. Application Data

[63] Continuation of Ser. No. 297,415, Oct. 13, 1972, abandoned.

[51] Int. Cl.² ............................................. C01G 25/00
[52] U.S. Cl. ............................... 423/265; 423/419 R; 423/420; 423/421; 106/316
[58] Field of Search ............... 423/419, 420, 421, 593, 423/265

[56] References Cited

U.S. PATENT DOCUMENTS

| 2,641,558 | 6/1953 | Urban et al. ..................... 423/420 X |
| 3,418,073 | 12/1968 | Blumenthal ....................... 423/420 X |
| 3,615,172 | 10/1971 | Fulson .............................. 423/593 X |
| 3,741,782 | 6/1973 | Stewart et al. ............... 423/593 UX |

OTHER PUBLICATIONS

Pospelova et al., "Chemical Abstracts", vol. 65, 1966, p. 19659(c).

*Primary Examiner*—Herbert T. Carter
*Attorney, Agent, or Firm*—Karl W. Flocks

[57] ABSTRACT

Aqueous solutions of R zirconium carbonate in which R is selected from ammonium and potassium have a carbonate: zirconium molar ratio not greater than 2.05 and can impart thixotropic properties to aqueous dispersions of polymers and copolymers, such as emulsion paint. The solutions may be prepared by reacting zirconium basic carbonate with ammonium or potassium carbonate solution and have a good storage stability, especially at high concentrations. They may be stabilized further by the addition of an acid selected from tartaric and gluconic acid.

5 Claims, No Drawings

PREPARATION OF AMMONIUM AND POTASSIUM ZIRCONIUM CARBONATES

This is a continuation, of application Ser. No. 297,415, filed Oct. 13, 1972, now abondoned.

BACKGROUND OF THE INVENTION

Ammonium zirconium carbonate solutions containing 10% by weight zirconia are commercially available and may be used whenever soluble zirconium in an alkaline environment is required. The solutions are commonly prepared by dissolving, at ambient temperatures, zirconium basic carbonate in a solution containing 3 moles of either commercial ammonium carbonate or a mixtue of ammonium bicarbonate and aqueous ammonia. From the method of preparation and the analysis of crystalline materials which have been obtained from these solutions the composition of the principal species present in the solution is believed to be $(NH_4)_3ZrOH(CO_3)_3$ which crystallises as a dihydrate.

Such ammonium zirconium carbonate solutions are extensively used for insolubilising the starch binders used in paper coating formulations. However, their use as starch insolubilisers and for other purposes is restricted because the solutions hydrolyse irreversibly at temperatures above 40° to produce zirconia gels. Further, because the solutions are dilute, the major part of their cost of transportation is the cost of transporting water.

As disclosed in our co-pending patent application U.S. Pat. No. 3,810,852 although some zirconium compounds have been found to impart thixotropy to certain dispersions of polymer or copolymers, for example emulsion paints, the commerically available ammonium zirconium carbonate solutions have not been found effective for that purpose.

It has been found that concentrated ammonium and potassium zirconium carbonate solutions which are capable of imparting thixotropic properties to aqueous dispersions of polymers and copolymers are more resistant to hydrolysis at elevated temperatures than the more dilute solutions which are presently available and can easily be prepared. In these preparations only limited quantities, generally of the order of one instead of three moles, of added carbonate may be used, which is found to be advantageous both economically and in giving solutions which behave as emulsion paint polymer gellants.

SUMMARY OF THE INVENTION

According to one aspect of the present invention, there is provided an aqueous soltuion of R zirconium carbonate, wherein R is selected from ammonium and potassium, the molar ratio of carbonate to Zirconium in the solution being not greater than 2.05 which is capable of imparting thixotropic properties to aqueous dispersions of polymers and copolymers when mixed therewith.

It has been found that ammonium zirconium carbonate solutions according to the present invention can be obtained which are stable for at least 10 hors at a temperature of 60° C.

As used in this description and the appended claims the term "stable" means having no tendency to gel or to form a solid precipitate from the components dissolved in the solution on storage.

According to another aspect of the invention, there is provided a method of preparing such a solution of ammonium zirconium carbonate which comprises reacting zirconium basic carbonate with an aqueous solution or slurry of ammonium carbonate containing 1 mole to 1.5 moles of ammonium carbonate per mole of zirconium basic carbonate.

According to yet another apsect of the invention, there is provided method of preparing such a solution of potassium zirconium carbonate which comprises reacting zirconium basic carbonate with an aqueous solution of potassium carbonate containing from 0.8 to 1.3 moles of potassium carbonate per mole of zirconium basic carbonate.

Zirconium basic carbonate usually contains from 0.45 to 0.55 moles of carbonate per mole of zirconium, so that the use of ammonium or potassium carbonate in the above-mentioned quantities enables a solution containing up to 2.05 moles of carbonate per mole of zirconium to be obtained.

In the preparation of the ammonium zirconium carbonate solution it has been found that, as the amount of ammonium carbonate increases above 1.5 moles, the efficiency of the solution in impartng thixotropic properties to aqueous dispersions of polymers is progressively reduced. It is also generally desirable to use the minimum quantity of ammonium carbonate in the interest of economy. However, the stability of the solution obtained deteriorates progressively and the viscosity of the solution increases as the amount of carbonate present is reduced and it has been found that 1.0 moles of ammonium carbonate per mole of zirconium basic carbonate is a practicle lower limit.

In the case of the ammonium zirconium carbonate solutions the addition of ammonium carbonate in a relatively large quantity e.g. 2.0 moles per mole of zirconium basic carbonate, makes it necessary to dilute the final solution further and further with water to prevent the gradual separation of crystals of hydrated ammonium zirconyl carbonate at ambient temperature. Such crystals also separate out from concentrated solution when cooled to temperatures near 0° C but this can be avoided by limiting the ammonium carbonate present to a maximum of 1.5 moles per mole of zirconium basic carbonate.

The reaction between zirconium basic carbonate and ammonium carbonate is aided by heating. According to one preferred procedure, a mixture of 30% aqueous ammonia and an equivalent quantity of ammonium bicarbonate is used in the preparation, in preferance to the more expensive ammonium carbonate, to form a slurry. The addition of ammonium bicarbonate to 30% aqueous ammonia proceeds endothermically and it is necessary to apply heat to the slurry to bring its temperature back to room temperature. Zirconium basic carbonate is added gradually to the slurry in such quantities that the viscosity of the slurry permits adequate agitation to be maintained and the temperature of the slurry is raised by the use of live steam or indirect heat. As the reaction proceeds the viscosity of the slurry drops and the slurry becomes clearer enabling more zirconium basic carbonate to be added. The temperature of the solution is finally raised to a temperature not exceeding 65° C., and the solution held at that temperature for a sufficient time to permit completion of the reaction.

It is to be noted that following the above procedure, the temperature is gradually raised to a temperature not exceeding 65° C during the addtion of zirconium basic carbonate. To raise the temperature of the slurry before any addition of zirconium basic carbonate had been made would lead to loss of ammonia from the reaction medium when the reaction is carried out in an open vessel.

In the preparation of potassium zirconium carbonate solutions by the method of the invention, it has been found that a satisfactory solution can be obtained using 0.8 moles of potassium carbonate per mole of zirconium basic carbonate: if less than 0.8 moles of potassium carbonate is used, the viscosity of the solution obtained increases as the amount of potassium carbonate decreases.

With potassium zirconium carbonate solutions contaning 22% $ZrO_2$ no crystals separate out even when the temperature of the solution is lowered to 0° C, and consequently there is no technical reason to limit the amount of potassium carbonate added from the point of view of preparing the solution. However, it is economically desirable to use the minimum amount of potassium carbonate and, in addition, the efficiency of potassium zirconium carbonate as an agent to impart thixotropy to aqueous dispersions of polymers and copolymers, that is as a paint gellent, falls off rapidly as the amount of potassium carbonate used in the preparation increases. Therefore, the amount of potassium carbonate used in the preparation of potassium zirconium carbonate is restricted to a maximum of 1.3 moles per mole of $ZrO_2$, so that the total molar ratio of carbonate to zirconium does not exceed 1.85.

Potassium carbonate is sufficiently soluble in water to form a 50% by weight solution. This reaction is exothermic and the solution attains a temperature of 50°–60° C. At this temperature dissolution of zirconium basic carbonate proceeds readily and the temperature is simply maintained by the use of live steam or an external hear source.

Unlike the ammonium zirconium carbonate solution, the potassium zirconium carbonate solution of the invention can be evaporated (e.g. by spray or drum drying) to produce the stable solid salt which may be subsequently be redissolved in water. It has been found that evaporation of the ammonium zirconium carbonate solution produces a decomposed solid which cannot be redissolved to give a solution according to the invention.

The solution of ammonium or potassium zirconium carbonate obtained preferably has a concentration of up to 25% by weight of zirconium expresses as $ZrO_2$; the use of a concentration close to this upper limit is advantageous as the stability of the solutions tends to fall with increasing dilution, especially with ammonium zirconium carbonate.

The use of a high concentration also gives important economics, particularly in transport costs. In the case of ammonium zirconium carbonate, a concentration of from 18% to 22% by weight, expressed as zirconium dioxide, is preferred.

The stability of the ammonium or potassium zirconium carbonate solutions according to the invention can be improved still further by the addition of tartaric or gluconic acid, preferably in an amount of about 1 – 2% by weight of the final solution. The tartaric or gluconic acid can be added after the reaction between the ammonium or potassium carbonate and the zirconium basic carbonate.

DESCRIPTION OF THE PREFERRED EMBODIMENTS

The following examples are given to illustrate the invention:

EXAMPLE 1

This example relates to the preparation of an ammonium zirconium carbonate solution containing a minimum of 20% by weight of $ZrO_2$ and 1.3 moles of ammonium carbonate.

10.3 k.g. (130 moles) of solid ammonium bicarbonate, $NH_4HCO_3$, were slowly added with stirring to a mixture of 7.4 litres of 30% aqueous ammonia (130 moles) and 8 litres of water to form a thick slurry of ammonium carbonate. As this reaction is endothermic, heat was supplied to bring the temperature of the slurry back to ambient. Still stirring and heating the slurry, 15 k.g. (50 moles) of zirconium basic carbonate containing 42% by weight of $ZrO_2$ was added. The stirring and heating was continued until the zirconium basic carbonate had dissolved and then a further 15 k.g. (50 moles) of zirconium basic carbonate was added at a rate at which the viscosity of slurry was such that the latter could easily be stirred. The temperature of the slurry was allowed to rise to 60° C, when the supply of heat was discontinued, and stirring was continued for a further hour for the reaction to be completed. A small quantity of a filter aid was added to the reaction medium which was then filtered under pressure.

The resulting clear solution was found to contain 22% by weight of $ZrO_2$ and was diluted with water to lower the $ZrO_2$ to 20% by weight. Heating the 20% solution at 60° C for at least four hours did not result in the formation of any hydrated gels and storage in a refrigerator at 0° C for 4 weeks did not cause the separation of any crystalline material. Attempts to isolate a stable solid from the solution by spray drying at a low temperature were not successful.

The solution was found to be capable of imparting thixotropy to aqueous dispersions of polymers and copolymers that is to say the solution was found to be an emulsion paint gellant.

EXAMPLE 2

This example describes the preparation of a solution of potassium zirconium carbonate containing 21% by weight of $ZrO_2$ and 1.0 moles. of potassium carbonate per mole of zirconium from which solution a solid containing about 40% of $ZrO_2$ may be separated by removal of the water.

1.38 k.g. (10 moles) of potassium carbonate was dissolved in 1.40 litres of water and the well-stirred solution heated to 55° C while still stirring. 3 k.g. (10 moles) of zirconium basic carbonate containing 42% $ZrO_2$ was added to the solution, which was maintained at a temperature ranging from 55° C – 60° C. At the end of the addition, the solution was maintained at from 55° C – 60° C with continuous stirring for a further hour to complete the reaction. The resulting solution was filtered under suction.

The final clear solution was found to contain 21% by weight of $ZrO_2$ and to be sufficiently stable to heat to permit the isolation of a solid potassium zirconium carbonate by spray drying or, preferably by drum drying at as low a temperature as possible consistent with obtaining a free-flowing product.

Both the solution and the dried product were found to behave as an active emulsion paint gellant.

In addition to this use in aqueous dispersions of polymers, such as emulsion paint, the ammonium zirconium carbonate solutions of the invention are useful for insolubilising the starch binders used in paper coating processes.

I claim:

1. In an aqueous solution of ammonium zirconium carbonate, the improvement wherein said solution
   a. contains 18–25% by weight of zirconium expressed as zirconium dioxide;
   b. has a molar ratio of carbonate to zirconium not greater than 2.05;
   c. is capable of imparting thixotropic properties to aqueous dispersions of polymers and copolymes when mixed therewith; and
   d. is stable for at least 10 hours at a temperature of 60° C.

2. A solution as claimed in claim 1 which is further stabilized by the addition of a compound selected from tartaric and gluconic acid.

3. A solution as claimed in claim 1, which contains from 18 to 22% by weight of zirconium expressed as zirconium dioxide.

4. A method of preparing a solution as claimed in claim 1, which comprises slowly reacting zirconium basic carbonate having a $CO_3$:Zr ratio between about 0.45 and 0.55 with an aqueous solution or slurry of ammonium carbonate containing from 1.0 to 1.5 moles of ammonium carbonate per mole of zirconium basic carbonate.

5. A method as claimed in claim 4 in which the zirconium basic carbonate is reacted with the solution or slurry at temperatures up to 65° C.

* * * * *